(12) United States Patent
Morita et al.

(10) Patent No.: US 11,961,992 B2
(45) Date of Patent: Apr. 16, 2024

(54) ELECTRODE AND SECONDARY BATTERY

(71) Applicant: AESC Japan Ltd., Zama-shi (JP)

(72) Inventors: Junpei Morita, Sagamihara (JP); Kazuya Mimura, Sagamihara (JP)

(73) Assignee: AESC Japan Ltd., Kanagawa (JP)

( * ) Notice: Subject to any disclaimer, the term of this patent is extended or adjusted under 35 U.S.C. 154(b) by 326 days.

(21) Appl. No.: 16/645,423

(22) PCT Filed: Sep. 6, 2018

(86) PCT No.: PCT/JP2018/033064
§ 371 (c)(1),
(2) Date: Mar. 6, 2020

(87) PCT Pub. No.: WO2019/049937
PCT Pub. Date: Mar. 14, 2019

(65) Prior Publication Data
US 2020/0212424 A1 Jul. 2, 2020

(30) Foreign Application Priority Data

Sep. 7, 2017 (JP) .................................. 2017-172057

(51) Int. Cl.
*H01M 4/131* (2010.01)
*H01M 4/48* (2010.01)

(52) U.S. Cl.
CPC .......... *H01M 4/131* (2013.01); *H01M 4/483* (2013.01)

(58) Field of Classification Search
CPC .... H01M 4/131; H01M 4/483; H01M 50/449; H01M 50/431
See application file for complete search history.

(56) References Cited

U.S. PATENT DOCUMENTS

| 6,365,299 | B1 | 4/2002 | Miyaki et al. | |
|---|---|---|---|---|
| 2002/0114993 | A1* | 8/2002 | Miyaki | H01M 4/485 429/246 |
| 2011/0123866 | A1* | 5/2011 | Pan | H01M 4/583 427/458 |
| 2015/0050544 | A1* | 2/2015 | Nam | H01M 50/431 429/144 |

(Continued)

FOREIGN PATENT DOCUMENTS

| CN | 1189247 A | 7/1998 |
|---|---|---|
| CN | 104377328 A | 2/2015 |
| JP | 2009-064566 A | 3/2009 |

(Continued)

OTHER PUBLICATIONS

International Search Report dated Dec. 11, 2018 in PCT/JP2018/033064 with English-language translation (4 pgs.).

(Continued)

*Primary Examiner* — Brian R Ohara
*Assistant Examiner* — Emily Elizabeth Freeman
(74) *Attorney, Agent, or Firm* — Foley & Lardner LLP

(57) ABSTRACT

An electrode includes a current collector, an active material layer, a first layer including first particles, and a second layer including second particles, wherein an average cross-sectional area of the first particles in a plane substantially parallel to the electrode surface is smaller than an average cross-sectional area of the second particles in a plane substantially parallel to the electrode surface.

17 Claims, 3 Drawing Sheets

(56) References Cited

U.S. PATENT DOCUMENTS

2018/0315969 A1* 11/2018 Sung ................... H01M 50/426

FOREIGN PATENT DOCUMENTS

| JP | 2009-070797 A | 4/2009 |
| JP | 2009-164130 A | 7/2009 |
| JP | 2012-229406 A | 11/2012 |
| JP | 2015-037078 A | 2/2015 |
| WO | WO-2005/078828 A1 | 8/2005 |
| WO | WO-2009/151054 A1 | 12/2009 |

OTHER PUBLICATIONS

Chinese Office Action issued in connection with CN Appl. Ser. No. 201880057827.2 dated Sep. 1, 2022.

* cited by examiner

ELECTRODE AND SECONDARY BATTERY

CROSS-REFERENCE TO RELATED APPLICATIONS

This application is a national stage entry of International Appl. No. PCT/JP2018/033064, filed Sep. 6, 2018, which claims priority to Japanese Appl. No. 2017-172057, filed Sep. 7, 2017; the disclosures of both of those applications are incorporated by reference herein in their entirety.

TECHNICAL FIELD

A present exemplary embodiment relates to an electrode and a secondary battery.

BACKGROUND ART

Secondary batteries are widely used as a power source for portable devices such as cellular phones, digital cameras, laptop computers, and the like, and as a power source for vehicles and households. Among them, a lithium ion secondary battery having a high energy density and a low weight has become an energy storage device indispensable for life.

The secondary battery may include an electrode laminate in which a sheet-like positive electrode and a sheet-like negative electrode are separated from each other by a separator and superposed, an electrolyte solution, and an outer package for containing the electrode laminate and the electrolyte solution. The positive electrode may include a positive electrode current collector and a positive electrode active material layer including a positive electrode active material formed on one or both surfaces of the positive electrode current collector. The negative electrode may include a negative electrode current collector and a negative electrode active material layer including a negative electrode active material formed on one or both surfaces of the negative electrode current collector.

As a structure of the separator, for example, Patent Document 1 discloses a separator having plate-shaped inorganic fine particles having a predetermined thickness, spherical organic fine particles having a predetermined particle diameter, and a binder resin. Patent Document 2 discloses a separator including a porous membrane formed by combining a ceramic material and a binder. Patent Document 3 discloses a porous electron insulating layer containing a particulate filler and a resin binder.

On the other hand, Patent Document 4 discloses, in addition to a separator, a nonaqueous electrolyte battery including an electrode having on its surface an inorganic particle layer containing inorganic particles composed of spherical or substantially spherical inorganic particles and non-spherical inorganic particles, and a binder.

CITATION LIST

Patent Literature

Patent Literature 1: JP2009-64566A
Patent Literature 2: JP2009-164130A
Patent Literature 3: WO2005/078828A1
Patent Literature 4: JP2009-70797A

SUMMARY OF INVENTION

Technical Problem

However, secondary batteries having these configurations are desired to further improve battery performance and safety. On the other hand, if a secondary battery having good battery performance, high safety, and no separator can be developed, the manufacturing cost can be reduced and the productivity can be improved.

An object of the present exemplary embodiment is to provide an electrode capable of providing a secondary battery having good battery performance and high safety.

Solution to Problem

An electrode according to the present exemplary embodiment includes a current collector, an active material layer, a first layer including first particles, and a second layer including second particles, wherein an average cross-sectional area of the first particles in a plane substantially parallel to the electrode surface is smaller than an average cross-sectional area of the second particles in a plane substantially parallel to the electrode surface.

An electrode according to the present exemplary embodiment includes a current collector, an active material layer, and a layer containing amorphous-shaped inorganic particles and plate-shaped inorganic particles.

A secondary battery according to the present exemplary embodiment includes an electrode according to the present exemplary embodiment.

Advantageous Effect of Invention

According to the present exemplary embodiment, it is possible to provide an electrode capable of providing a secondary battery having good battery performance and high safety.

DESCRIPTION OF EMBODIMENTS

[Electrode]

First Exemplary Embodiment

The electrode according to the first exemplary embodiment includes a current collector, an active material layer, the first layer including first particles, and the second layer including second particles. Here, the average cross-sectional area of the first particles in a plane substantially parallel to the electrode surface (hereinafter also referred to as the "average cross-sectional area of the first particles") is smaller than the average cross-sectional area of the second particles in a plane substantially parallel to the electrode surface (hereinafter also referred to as the "average cross-sectional area of the second particles"). The "plane substantially parallel to the electrode surface" denotes a plane parallel to the electrode surface within a range of ±5° thereto.

In the electrode according to the present exemplary embodiment, the average cross-sectional area of the first particles included in the first layer is smaller than the average cross-sectional area of the second particles included in the second layer. Incidentally, during the charging or discharging process, ions such as Li ions diffuse mainly in the stacking direction of the electrodes. Here, as described above, the first layer having a smaller cross-sectional area of each particle has a larger number of particle gaps when viewed from the stacking direction of the electrodes as compared with the second layer. Accordingly, the diffusion distance of the ions in the first layer is shorter than the diffusion distance of the ions in the second layer. That is, since ions easily pass through the first layer and the resistance is lowered, the battery performance can be improved. On the other hand, in the second layer, when ions diffuse and pass through the second layer, the frequency of collision with the above-mentioned second particles increases, and accordingly the diffusion distance increases. That is, in the second layer, the time for ions to pass through can be prolonged. As a result, safety can be enhanced even when, for example, a short circuit between the electrodes occurs. Therefore, the electrode according to the present exemplary embodiment can achieve both high battery performance and high safety.

Further, since the first layer and the second layer have the function of a separator, when a secondary battery is manufactured using the electrode according to the present exemplary embodiment, it is unnecessary to use a separator separately, manufacturing cost can be reduced, and productivity can be improved. Note that the electrode according to the present exemplary embodiment may be a positive electrode or a negative electrode; however, since the area of the negative electrode is generally larger than that of the positive electrode, it is preferable to apply the electrode according to the present exemplary embodiment as the negative electrode when a separator is not used separately in manufacturing the secondary battery.

Figure 1:
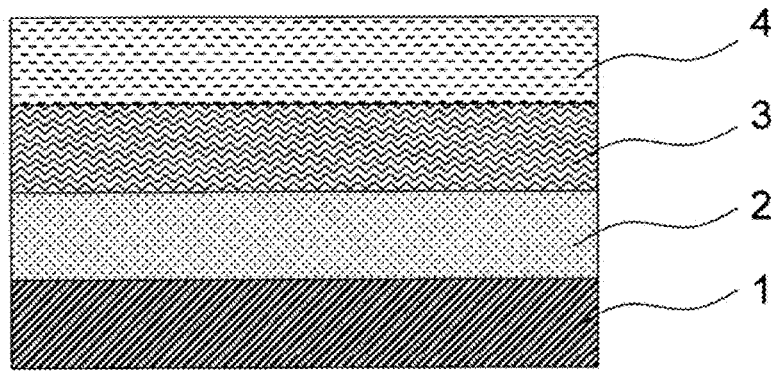
FIG. 1 is a cross-sectional view showing an example of an electrode according to the present exemplary embodiment.
Figure 2:
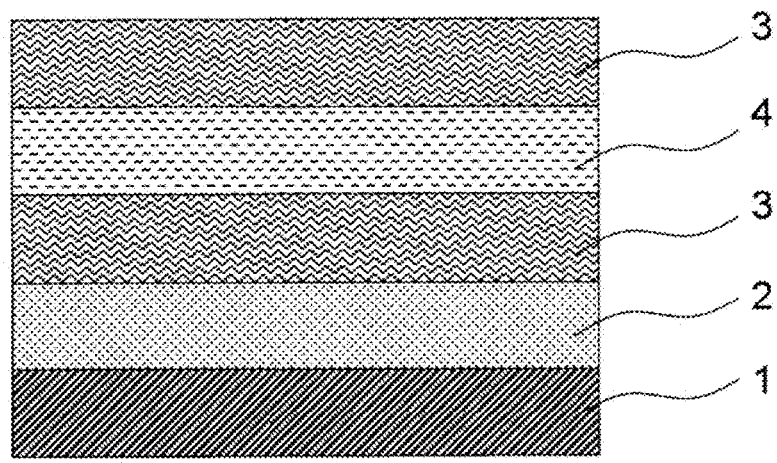
FIG. 2 is a cross-sectional view showing an example of an electrode according to the present exemplary embodiment.

An example of an electrode according to the present exemplary embodiment is shown in FIG. 1. The electrode shown in FIG. 1 includes a current collector 1, an active material layer 2, a first layer 3 and a second layer 4 in this order. The electrode according to the present exemplary embodiment may have other layers other than the current collector 1, the active material layer 2, the first layer 3, and the second layer 4. A plurality of the first layer 3 and/or the second layer 4 may be stacked. For example, as shown in FIG. 2, the first layer 3 may be further formed on the second layer 4. In this case, if the average cross-sectional area of the first particles included in the two first layers 3 is smaller than the average cross-sectional area of the second particles included in the second layer 4, the two first layers 3 may have the same configuration or different configurations. The active material layer 2 and the first layer 3 are preferably in contact with each other. The first layer 3 and the second layer 4 are preferably in contact with each other. In the electrodes shown in FIGS. 1 and 2, the active material layer 2, the first layer 3, and the second layer 4 are formed on one surface of the current collector 1, but the active material layer 2, the first layer 3, and the second layer 4 may be formed on both surfaces of the current collector 1.

(Current Collector)

When the electrode according to this exemplary embodiment is a positive electrode, aluminum or an aluminum alloy is preferable as a material of the positive electrode current collector. When the electrode according to the present exemplary embodiment is a negative electrode, copper, stainless steel, nickel, titanium, or an alloy thereof can be used as a material of the negative electrode current collector. The current collector may have a foil shape, and the thickness thereof is not particularly limited.

(Active Material Layer)

The active material layer may include an active material. When the electrode according to the present exemplary embodiment is a positive electrode, examples of the positive electrode active material include a layered oxide-based material such as $LiNiO_2$, $LiNi_{(1-x)}Co_xO_2$, $LiNi_x(CoAl)_{(1-x)}O_2$, $Li_2MnO_3$—$LiNiO_2$, $LiNi_xCo_yMn_{(1-x-y)}O_2$, a spinel-based material such as $LiMn_{1.5}Ni_{0.5}O_4$, $LiMn_{(2-x)}Ni_xO_4$, an olivine-based material such as $LiNiPO_4$, and a fluorinated olivine-based material such as $Li_2NiO_4F$, $Li_2NiO_4F$. One of these materials may be used, or two or more types of these materials may be used in combination.

When the electrode according to the present exemplary embodiment is a negative electrode, for example, a carbon material such as graphite, amorphous carbon, diamond-like carbon, fullerenes, carbon nanotubes, or carbon nanohorns, a lithium-metal material, an alloy-based material such as silicon, tin or the like, an oxide-based material such as $Nb_2O_5$, $TiO_2$, or composites thereof can be used as the negative electrode active material. One of these materials may be used, or two or more types of these materials may be used in combination.

The electrode according to the present exemplary embodiment may include a binder, a conductive auxiliary agent, and the like in addition to the active material. Examples of the binder include polyvinylidene fluoride (PVDF), polytetrafluoroethylene, carboxymethylcellulose, and modified acrylonitrile rubber particles. Examples of the conductive auxiliary agent include carbon black, carbon fiber, graphite, and the like. One of these may be used, or two or more types of these may be used in combination.

The thickness of the active material layer is not particularly limited as long as it is formed over the current collector.

(First Layer, Second Layer)

In the electrode according to the present exemplary embodiment, the average cross-sectional area of the first particles included in the first layer is smaller than the average cross-sectional area of the second particles included in the second layer. Therefore, as described above, the diffusion distance of ions such as Li ions is short in the first layer, and the diffusion distance of ions is long in the second layer. As described above, since the electrode according to the present exemplary embodiment has both the first layer through which ions can easily pass and the second layer through which ions cannot easily pass, high battery performance and high safety can be achieved at the same time.

The average cross-sectional area of the first particles is preferably in the range of 0.05 to 1.0 $\mu m^2$, and more preferably in the range of 0.3 to 0.4 $\mu m^2$ from the viewpoint of reducing the resistivity. The average cross-sectional area of the second particles is preferably in the range of 1 to 36 $\mu m^2$, and more preferably in the range of 3 to 12 $\mu m^2$ from the viewpoint of safety improvement. The average cross-sectional area of the first particles is preferably ⅓ or less of the average cross-sectional area of the second particles, more preferably 1/20 or less. The average cross-sectional areas of the first and the second particles respectively can be observed with a microscope or the like and automatically calculated by image processing. Examples of the software that can be used for the image processing include Win-ROOF2013 (trade name, manufactured by Mitani Corporation).

The first particles included in the first layer are not particularly limited as long as the average cross-sectional area of the first particles is smaller than the average cross-sectional area of the second particles, but an amorphous-shaped inorganic particle is preferable from the viewpoint of making it easier to pass ions and lower the resistance. Here, the "amorphous-shaped" is a shape that is not classified into a spherical shape, a columnar shape, a plate shape, or a similar predetermined shape, and includes, for example, a dendritic shape, a coral shape, a three-dimensional shape having three or more corner portions in contact with one virtual surface (hereinafter, also referred to as a nearly tetrapot shape), and the like. In particular, it is preferable that the first particle is an inorganic particle having a substantially tetrapot shape from the viewpoint of lowering the resistance. As the inorganic particles having a substantially tetrapot shape, for example, AKP-3000 (trade name, a-alumina manufactured by Sumitomo Chemical Co., Ltd.) or the like can be used in a commercial product.

As the material of the amorphous-shaped inorganic particles, a metal oxide can be used, and for example, titanium oxide, zirconium oxide, magnesium oxide, calcium oxide, aluminum oxide, or the like can be used. Among these, a-alumina is preferable as the material. One of these may be used, or two or more types of these may be used in combination.

The specific surface area of the amorphous-shaped inorganic particles is preferably 0.5 to 50 $m^2/g$, more preferably 1 to 10 $m^2/g$. The specific surface area is a value measured and calculated by the BET method. The center particle diameter D50 of the amorphous-shaped inorganic particles is preferably 0.1 to 5 μm, more preferably 0.3 to 1 μm. The center particle diameter (D50) is a value measured by a particle size distribution measuring device (trade name: MT3300, manufactured by Microtrack Bell Co., Ltd.).

The second particles included in the second layer are not particularly limited as long as the average cross-sectional area of the second particles is larger than the average cross-sectional area of the first particles, but a plate-shaped inorganic particle is preferable from the viewpoint of being able to further limit the speed at which the ions pass and further improve safety.

As a material of the plate-shaped inorganic particles, a metal oxide can be used, and for example, titanium oxide, zirconium oxide, magnesium oxide, calcium oxide, aluminum oxide, or the like can be used. One of these may be used, or two or more types of these may be used in combination.

The specific surface area of the plate-shaped inorganic particles is preferably 1 to 10 $m^2/g$, more preferably 3 to 7 $m^2/g$. The specific surface area is a value measured and calculated by the BET method. The center particle diameter D50 of the plate-shaped inorganic particles is preferably 1 to 10 μm, more preferably 3 to 7 μm. The center particle diameter (D50) is a value measured by a particle size distribution measuring device (trade name: MT3300, manufactured by Microtrack Bell Co., Ltd.). The thickness of the plate-shaped inorganic particles may be, for example, 0.1 to 2 μm. The aspect ratio of the plate-shaped inorganic particles (maximum length/minimum length of the plate-shaped inorganic particles) can be, for example, 1 to 3.

The content of the first particles contained in the first layer is preferably 70% by mass or more, more preferably 90 to 99% by mass. The content of the second particles contained in the second layer is preferably 70% by mass or more, more preferably 90 to 99% by mass.

The first layer and the second layer may further include a resin as a binder. Examples of the resins include PVDF.

The ratio of the thicknesses of the first layer and the second layer (first layer/second layer) is preferably 0.25 to 4, more preferably 0.33 to 1.33, from the viewpoint that high battery performance and high safety can be more compatible. The thickness of the first layer is preferably not less than 1 μm and not more than 10 μm, more preferably not less than 1 μm and not more than 4 μm from the viewpoint of lowering the resistance. The thickness of the second layer is preferably not less than 1 μm and not more than 10 μm from the viewpoint of safety improvement, and more preferably not less than 4 μm and not more than 10 μm. When the electrode has a plurality of first layers and/or second layers, the ratio of the thicknesses indicates a ratio of the total thicknesses of the plurality of layers. For example, if the electrode has two layers of the first layer 3 as shown in FIG. 2, the ratio of said thicknesses is shown by (the total thickness of the two first layers 3)/(the thickness of the second layer 4).

(Method of Manufacturing an Electrode)

A method of manufacturing the electrode according to the present exemplary embodiment is not particularly limited. For example, a slurry in which an active material, a binding agent, and a conductive auxiliary agent are dispersed in a solvent is applied to the surface of a current collector, dried, and solidified, thereby forming an active material layer on the current collector. Next, a slurry containing first particles, a resin, and a solvent is applied to the surface of the active material layer, dried, and solidified, thereby forming a first layer on the active material layer. Next, a slurry containing second particles, a resin, and a solvent is applied to the surface of the first layer, dried, and solidified, thereby forming a second layer on the first layer. Further, another first layer may be formed on the second layer in a similar manner. Thereafter, by compressing the sheet in which the active material layer, the first layer, and the second layer are formed on the current collector to an appropriate thickness, the electrode according to this exemplary embodiment can be obtained.

Second Exemplary Embodiment

The electrode according to the second exemplary embodiment includes a current collector, an active material layer, and a layer containing amorphous-shaped inorganic particles and plate-shaped inorganic particles (hereinafter, also referred to as a mixed inorganic particles layer).

Since the mixed inorganic particles layer of the electrode according to the present exemplary embodiment contains amorphous-shaped inorganic particles, the electrolyte solution containing ions easily passes through the electrode surface due to the existence of voids -derived from the inorganic particles, and the resistance is lowered. As a result, the battery performance can be improved. In addition, since the mixed inorganic particles layer contains plate-shaped inorganic particles, the speed at which ions pass is limited by the presence of the inorganic particles, so that safety can be enhanced even when, for example, short-circuiting between electrodes occurs. Therefore, the electrode according to the present exemplary embodiment can achieve both high battery performance and high safety.

Further, since the mixed inorganic particles layer has the function of a separator, when a secondary battery is manufactured using the electrode according to the present exemplary embodiment, it is unnecessary to use a separator separately, manufacturing cost can be reduced, and productivity can be improved. Note that the electrode according to the present exemplary embodiment may be a positive electrode or a negative electrode; however, since the area of the negative electrode is generally larger than that of the positive electrode, it is preferable to apply the electrode according to the present exemplary embodiment as the negative electrode when a separator is not used separately in manufacturing the secondary battery.

Figure 3:
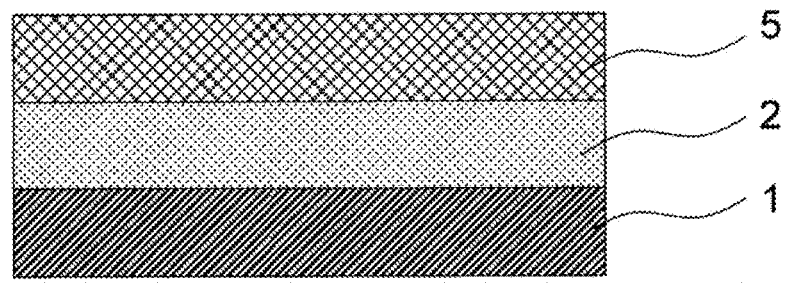
FIG. 3 is a cross-sectional view showing an example of an electrode according to the present exemplary embodiment.

An example of the electrode according to the present exemplary embodiment is shown in FIG. 3. The electrode shown in FIG. 3 includes a current collector 1, an active material layer 2, and a mixed inorganic particles layer 5 in this order. The electrode according to the present exemplary embodiment may have two or more different mixed inorganic particles layers 5, and may have another layer other than the current collector 1, the active material layer 2, and the mixed inorganic particles layer 5. The active material layer 2 and the mixed inorganic particles layer 5 are preferably in contact with each other.

(Current Collector, Active Material Layer)

The current collector and the active material layer in the present exemplary embodiment can be the same as the current collector and the active material layer in the first exemplary embodiment.

(Mixed Inorganic Particles Layer)

The mixed inorganic particles layer in the present exemplary embodiment includes amorphous-shaped inorganic particles and plate-shaped inorganic particles. As the amorphous-shaped inorganic particles and the plate-shaped inorganic particles, those same to the amorphous-shaped inorganic particles and the plate-shaped inorganic particles in the first exemplary embodiment can be used. As the ratio of the amorphous-shaped inorganic particles and the plate-shaped inorganic particles in the mixed inorganic particles layer, the ratio of the amorphous-shaped inorganic particles is preferably 30 to 70% by mass, more preferably 30 to 40% by mass, with respect to the total 100% by mass of the amorphous-shaped inorganic particles and the plate-shaped inorganic particles.

The total content of the amorphous-shaped inorganic particles and the plate-shaped inorganic particles contained in the mixed inorganic particles layer is preferably 70% by mass or more, more preferably 90 to 99% by mass.

The mixed inorganic particles layer may further include a resin as a binder. Examples of the resins include PVDF.

The thickness of the inorganic particle mixture layer is preferably 2 to 20 μm, and more preferably 16 to 20 μm from the viewpoint of improving battery performance and safety.

(Method of Manufacturing an Electrode)

A method of manufacturing the electrode according to the present exemplary embodiment is not particularly limited. For example, a slurry in which an active material, a binding agent, and a conductive auxiliary agent are dispersed in a solvent is applied to the surface of a current collector, dried, and solidified, thereby forming an active material layer on the current collector. Next, a slurry containing amorphous-shaped inorganic particles, plate-shaped inorganic particles, a resin, and a solvent is applied to the surface of the active material layer, dried, and solidified, thereby forming a mixed inorganic particles layer on the active material layer. Thereafter, by compressing the sheet in which the active material layer and the mixed inorganic particles layer are formed on the current collector to an appropriate thickness, the electrode according to the present exemplary embodiment can be obtained.

[Secondary Battery]

The secondary battery according to the present exemplary embodiment has an electrode according to at least one of the first exemplary embodiment and the second exemplary embodiment. Since the secondary battery according to the present exemplary embodiment has the electrode according to at least one of the first exemplary embodiment and the second exemplary embodiment, the secondary battery has high battery performance and high safety. Further, since it is unnecessary to use a separator separately, the secondary battery can be manufactured at low manufacturing cost and high productivity. That is, the secondary battery according to the present exemplary embodiment can have no separator. As described above, the electrode according to at least one of the first exemplary embodiment and the second exemplary embodiment may be applied to a positive electrode or a negative electrode, but is preferably applied to a negative electrode. The secondary battery according to the present exemplary embodiment can be a lithium ion secondary battery.

Figure 4:
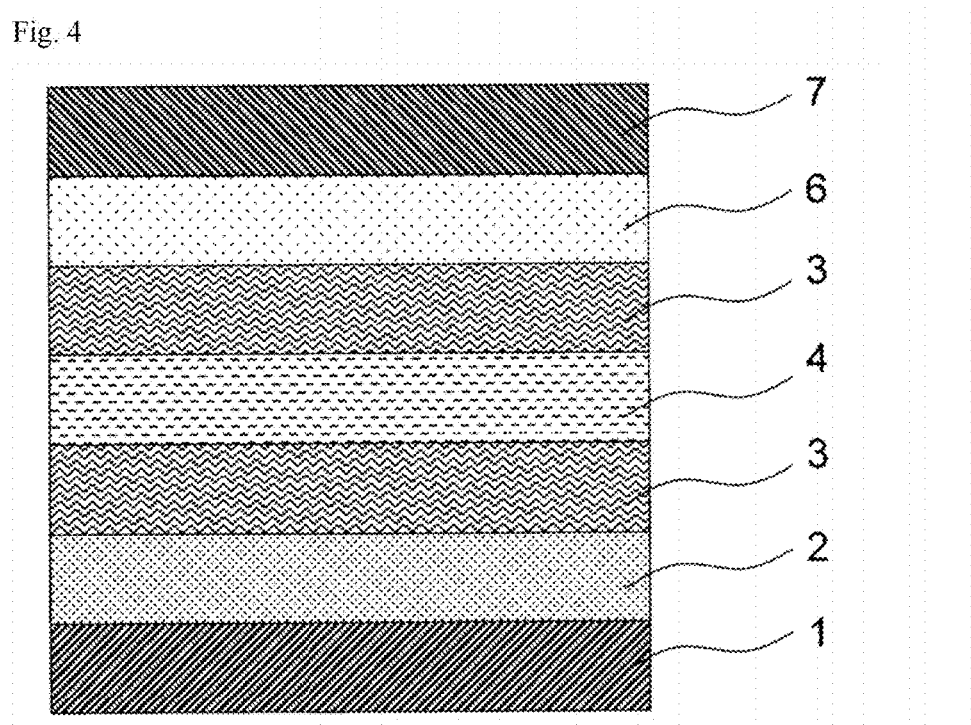
FIG. 4 is a cross-sectional view showing an example of an electrode laminate using an electrode according to the present exemplary embodiment as a negative electrode.

FIG. 4 shows an example of an electrode laminate using the electrode according to the first exemplary embodiment as a negative electrode. The electrode laminate shown in FIG. 4 includes a negative electrode current collector 1, a negative electrode active material layer 2, a first layer 3, a second layer 4, a first layer 3, a positive electrode active material layer 6, and a positive electrode current collector 7 in this order. The negative electrode current collector 1, the negative electrode active material layer 2, the first layer 3, the second layer 4, and the first layer 3 correspond to the negative electrode according to the first exemplary embodiment. The positive electrode active material layer 6 and the positive electrode current collector 7 correspond to a positive electrode. Since, in the electrode laminate, the first layer 3, the second layer 4, and the first layer 3 of the negative electrode serve as a separator, the electrode laminate does not include a separator between the negative electrode and the positive electrode separately. The electrode laminate may have other layers besides the current collector 1, the active material layer 2, the first layer 3, the second layer 4, the positive electrode active material layer 6, and the positive electrode current collector 7.

Figure 5:
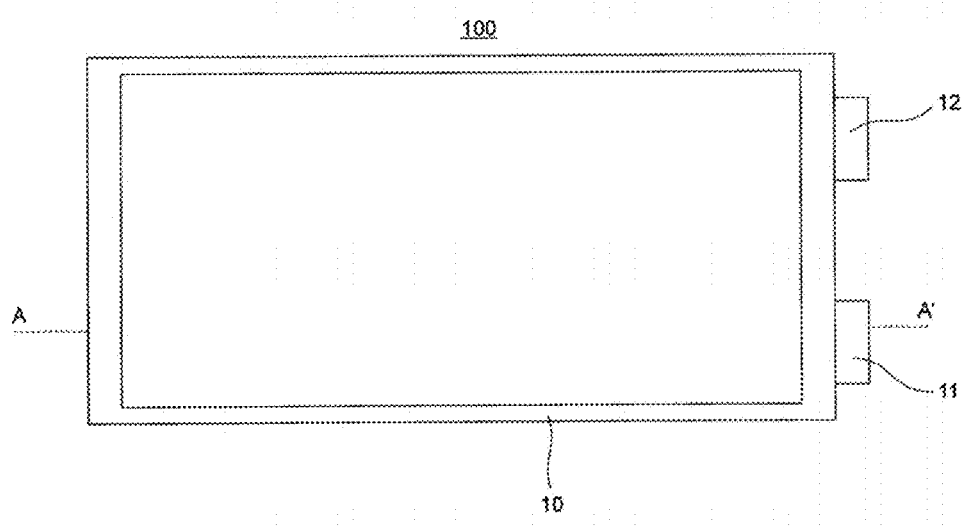
FIG. 5 is a plan view showing an example of a secondary battery using an electrode according to the present exemplary embodiment as a negative electrode.
Figure 6:
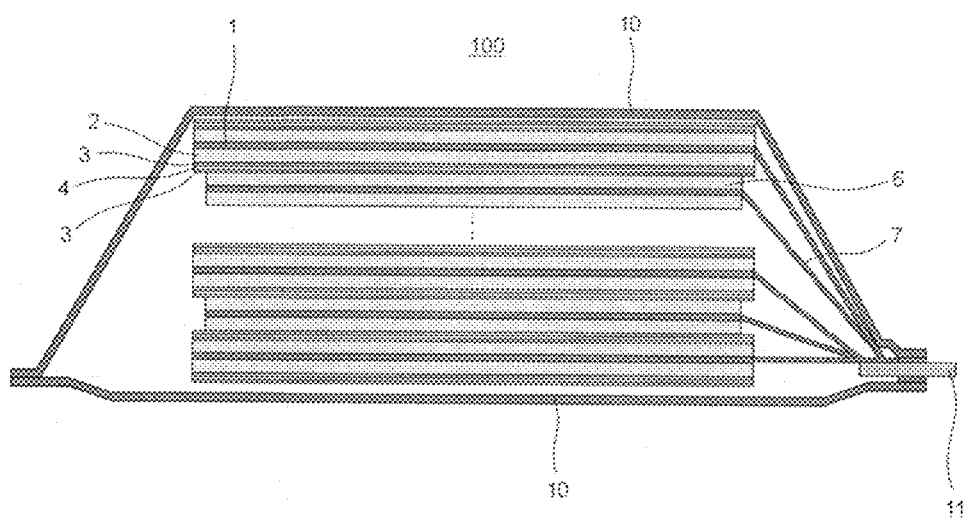
FIG. 6 is a cross-sectional view showing an example of a secondary battery using an electrode according to the present exemplary embodiment as a negative electrode.

FIGS. 5 and 6 show an example of a secondary battery in which the electrode according to the first exemplary embodiment is used as a negative electrode. FIG. 6 shows a cross-sectional view taken along A-A' of FIG. 5 that shows the secondary cell. The secondary battery 100 shown in FIGS. 5 and 6 includes an electrode laminate that includes the negative electrode in which the negative electrode active material layer 2, the first layer 3, the second layer 4, and the first layer 3 are laminated in this order on both surfaces of the negative electrode current collector 1, and a positive electrode in which a positive electrode active material layer 6 is provided on both surfaces of the positive electrode current collector 7, a plurality of the negative electrodes and a plurality of the positive electrodes being alternately laminated. In FIG. 6, a part of each layer constituting the electrode laminate (layers located at an intermediate portion in the thickness direction) is omitted. The electrode laminate is accommodated in an outer package 10 made of a flexible film together with an electrolyte (not shown). One end of the negative electrode terminal 11 is connected to the negative electrode current collector 1 of the electrode laminate, and one end of the positive electrode terminal 12 is connected to the positive electrode current collector 7, and the other end side of the negative electrode terminal 11 and the other end side of the positive electrode terminal 12 are drawn out to the outside of the outer package 10, respectively.

As the electrolytic solution, an organic solvent in which a lithium salt is dissolved can be used. As the lithium salt, lithium imide salt, $LiPF_6$, $LiAsF_6$, $LiAlCl_4$, $LiClO_4$, $LiBF_4$, $LiSbF_6$, and the like can be given. One of these may be used, or two or more types of these may be used in combination. Examples of the organic solvent include cyclic carbonates such as ethylene carbonate, propylene carbonate, vinylene carbonate, and butylene carbonate; chain carbonates such as ethyl methyl carbonate (EMC), diethyl carbonate (DEC), dimethyl carbonate (DMC), and dipropyl carbonate (DPC); aliphatic carboxylic acid esters; γ-lactones such as γ-butyrolactone; chain ethers; and cyclic ethers. One of these may be used, or two or more types of these may be used in combination.

A case made of a flexible film, a can case, or the like can be used as the outer package. From the viewpoint of reducing the weight of the secondary battery, it is preferable to use a flexible film for the outer package. As the flexible film, a film in which a resin layer is provided on the front surface and the back surface of a metal layer serving as a base material can be used. As a material of the metal layer, a material having a barrier property such as preventing leakage of an electrolyte solution or penetration of moisture from the outside can be selected, and for example, aluminum, stainless steel, or the like can be used, for example. At least on one surface of the metal layer, a heat-fusible resin layer such as a modified polyolefin may be provided. An outer package can be formed by making the heat-fusible resin layers of the flexible film to face each other and heat-fusing the periphery of a portion accommodating the electrode laminate. On the surface of the outer package on the opposite side to a surface thereof on which the heat-fusible resin layer is formed, a resin layer such as a nylon film or a polyester film can be provided.

The positive electrode terminal may be formed of aluminum or an aluminum alloy. For the negative electrode terminal, copper, a copper alloy, nickel plating on them, or the like can be used. The other end side of each terminal is pulled out to the outside of the outer package. A heat-fusing resin can be provided in advance at a portion of each terminal corresponding to a portion of the outer peripheral portion of the outer package to be heat-fused.

In the foregoing, the present invention has been described with reference to the exemplary embodiments, however, the present invention is not limited to the exemplary embodiments. Various modifications understandable to those skilled in the art may be made to the constitution and the details of the present invention within the scope thereof.

This application claims the right of priority based on Japanese Patent Application No. 2017-172057, filed on Sep. 7, 2017, the entire disclosure of which is incorporated herein by reference.

REFERENCE SIGNS LIST

1 Current collector (negative electrode current collector)
2 Active material layer (negative electrode active material layer)
3 First layer
4 Second layer
5 Mixed inorganic particles layer
6 Positive electrode active material layer
7 Positive electrode current collector
10 Outer package
11 Negative electrode terminal
12 Positive electrode terminal
100 Secondary battery

The invention claimed is:

1. An electrode comprising a current collector, an active material layer, a first layer comprising first particles, and a second layer comprising second particles,
wherein the first particles are amorphous-shaped inorganic particles, the second particles are plate-shaped inorganic particles, each of the first particles has a largest cross-sectional area in a plane substantially parallel to the electrode surface, each of the second particles has a largest cross-sectional area in a plane substantially parallel to the electrode surface, and an average cross-sectional area of the largest cross-sectional areas of the first particles is smaller than an average cross-sectional area of the largest cross-sectional areas of the second particles.

2. The electrode according to claim 1, wherein the current collector, the active material layer, the first layer, and the second layer are included in this order.

3. The electrode according to claim 1, wherein the amorphous-shaped inorganic particles comprise at least one compound selected from the group consisting of titanium oxide, zirconium oxide, magnesium oxide, calcium oxide and aluminum oxide.

4. The electrode according to claim 1, wherein the plate-shaped inorganic particles comprise at least one compound selected from the group consisting of titanium oxide, zirconium oxide, magnesium oxide, calcium oxide and aluminum oxide.

5. The electrode according to claim 1, wherein a ratio of the thickness of the first layer to the thickness of the second layer (first layer/second layer) is within a range of 0.25 to 4.

6. An electrode comprising: a current collector; an active material layer; and a layer comprising amorphous-shaped inorganic particles and plate-shaped inorganic particles,
wherein each of the amorphous-shaped inorganic particles has a largest cross-sectional area in a plane substantially parallel to the electrode surface, each of the plate-shaped inorganic particles has a largest cross-sectional area in a plane substantially parallel to the electrode surface, and an average cross-sectional area of the largest cross-sectional areas of the amorphous-shaped inorganic particles is smaller than an average cross-sectional area of the largest cross-sectional areas of the plate-shaped inorganic particles.

7. A secondary battery comprising the electrode according claim 1.

8. The secondary battery according to claim 7, wherein a separator is not included.

9. The electrode according to claim 6, wherein the amorphous-shaped inorganic particles comprise at least one compound selected from the group consisting of titanium oxide, zirconium oxide, magnesium oxide, calcium oxide and aluminum oxide.

10. The electrode according to claim 6, wherein the plate-shaped inorganic particles comprise at least one compound selected from the group consisting of titanium oxide, zirconium oxide, magnesium oxide, calcium oxide and aluminum oxide.

11. The electrode according to claim 6, wherein a ratio of the amorphous-shaped inorganic particles in the layer comprising the amorphous-shaped inorganic particles and the plate-shaped inorganic particles is 30 to 70% by mass with respect to the total 100% by mass of the amorphous-shaped inorganic particles and the plate-shaped inorganic particles.

12. A secondary battery comprising the electrode according to claim 6.

13. The secondary battery according to claim 12, wherein a separator is not included.

14. The electrode according to claim 1,
wherein a content of the first particles in the first layer is 70% by mass or more, and
a content of the second particles in the second layer is 70% by mass or more.

15. The electrode according to claim 6,
wherein a ratio of the amorphous-shaped inorganic particles in the layer comprising the amorphous-shaped inorganic particles and the plate-shaped inorganic particles is 30 to 70% by mass with respect to the total 100% by mass of the amorphous-shaped inorganic particles and the plate-shaped inorganic particles, and
a total content of the amorphous-shaped inorganic particles and the plate-shaped inorganic particles in the layer comprising the amorphous-shaped inorganic particles and the plate-shaped inorganic particles is 70% by mass or more.

16. The electrode according to claim 1, wherein the amorphous-shaped inorganic particles are metal oxide, and the plate-shaped inorganic particles are metal oxide.

17. The electrode according to claim 6, wherein the amorphous-shaped inorganic particles are metal oxide, and the plate-shaped inorganic particles are metal oxide.

* * * * *